United States Patent
Meng et al.

(10) Patent No.: US 12,292,412 B1
(45) Date of Patent: May 6, 2025

(54) TENSION-TORSION LOADING TOOLING AND TENSION-TORSION LOADING TEST SYSTEM THEREOF

(71) Applicant: TIANMUSHAN LABORATORY, Hangzhou (CN)

(72) Inventors: Li Meng, Hangzhou (CN); Yaoming Zhou, Hangzhou (CN); Daochun Li, Hangzhou (CN); Hai Li, Hangzhou (CN)

(73) Assignee: TIANMUSHAN LABORATORY, Hangzhou (CN)

( * ) Notice: Subject to any disclaimer, the term of this patent is extended or adjusted under 35 U.S.C. 154(b) by 0 days.

(21) Appl. No.: 19/012,006

(22) Filed: Jan. 7, 2025

(30) Foreign Application Priority Data

Jun. 19, 2024 (CN) .......................... 202410788328.8

(51) Int. Cl.
    *G01N 3/04*     (2006.01)
    *G01N 3/08*     (2006.01)
    *G01N 3/22*     (2006.01)

(52) U.S. Cl.
    CPC ................ *G01N 3/04* (2013.01); *G01N 3/08* (2013.01); *G01N 3/22* (2013.01); *G01N 2203/0017* (2013.01); *G01N 2203/0026* (2013.01); *G01N 2203/0268* (2013.01)

(58) Field of Classification Search
CPC .. G01N 3/04; G01N 3/22; G01N 3/08; G01N 2203/0268; G01N 2203/0017; G01N 2203/0026
See application file for complete search history.

(56) References Cited

U.S. PATENT DOCUMENTS

| | | | | |
|---|---|---|---|---|
| 7,051,600 B1* | 5/2006 | Cavallaro | ................ | G01N 3/08 |
| | | | | 73/862.041 |
| 7,204,160 B1* | 4/2007 | Sadegh | .................... | G01N 3/10 |
| | | | | 73/862.041 |
| 8,082,802 B1* | 12/2011 | Sadegh | .................... | G01N 3/08 |
| | | | | 73/856 |
| 8,671,771 B2* | 3/2014 | Hanabusa | ................ | G01N 3/08 |
| | | | | 73/826 |
| 2016/0216182 A1* | 7/2016 | Zhao | ........................ | G01N 3/08 |
| 2020/0124510 A1* | 4/2020 | Ma | ........................... | G01N 3/32 |

FOREIGN PATENT DOCUMENTS

CN           109612827 A   *   4/2019

\* cited by examiner

*Primary Examiner* — Jonathan M Dunlap
(74) *Attorney, Agent, or Firm* — WCF IP

(57) ABSTRACT

Provided are a tension-torsion loading tooling, and a tension-torsion loading test system thereof, belonging to the technical field of material testing. The tension-torsion loading tooling includes a connector, a clamping head, and a connecting rod assembly. The connecting rod assembly includes four horizontal connecting rods, and four inclined connecting rods, the four horizontal connecting rods are sequentially hinged from end to end to form a parallelogram structure, and each of four diagonal corners of the parallelogram structure is hinged with one end of each of the four inclined connecting rods. The other ends of two inclined connecting rods on the diagonal corners are hinged with the connector, and the other ends of the other two inclined connecting rods are hinged with the clamping head. The tension-torsion loading test system includes a tensile testing machine, and a tension-torsion loading tooling.

14 Claims, 6 Drawing Sheets

TENSION-TORSION LOADING TOOLING AND TENSION-TORSION LOADING TEST SYSTEM THEREOF

CROSS-REFERENCE TO RELATED APPLICATION

This patent application claims the benefit and priority of Chinese Patent Application No. 2024107883288, filed with the China National Intellectual Property Administration on Jun. 19, 2024, the disclosure of which is incorporated by reference herein in its entirety as part of the present application.

TECHNICAL FIELD

The present disclosure relates to the technical field of material testing, and in particular to a tension-torsion loading tooling, and a tension-torsion loading test system thereof.

BACKGROUND

Multi-axial loading is a typical service condition of key structural parts in aerospace, nuclear power engineering, and numerous other fields. Under the action of multi-axial stress loading, the structure failure has the characteristics of sudden and destructive. Therefore, the development of multi-axial loading test technology and equipment for materials has been widely concerned in engineering and science fields. At present, the commonly used tensile-torsion combined test equipment is mainly a tensile-torsion composite test system. The existing tensile-torsion composite test system is an electro-hydraulic servo test system, which can meet the complex requirements of static and dynamic tests of materials and structures, and can perform axial, torsional, and tensile-torsional composite tests. The core component of the existing tension-torsion composite test system is a multi-axial hydraulic servo test machine. However, the price of multi-axial hydraulic servo testing machine is usually expensive, and the high purchase cost limits the research on multi-axial loading of materials and structures in engineering and scientific research fields.

SUMMARY

An objective of the present disclosure is to provide a tension-torsion loading tooling and a tension-torsion loading test system thereof, thus solving the technical problem above. By using the deformable characteristics of the parallelogram, a displacement of a test piece in a tensile direction is transformed into a position change of a diagonal line of the parallelogram, then a torsional load is applied, and a tensile load is applied to achieve a tensile-torsion loading mode. The production cost of the tension-torsion loading tooling is low, which can be ignored compared with the tensile testing machine, while the tensile testing machine is a uniaxial testing machine, the purchasing cost of which is much lower than that of the multi-axial loading testing machine.

To achieve the objective above, the present disclosure provides the following solutions: the present disclosure provides a tension-torsion loading tooling. The tension-torsion loading tooling includes a connector, a clamping head, and a connecting rod assembly. The connector is used for being clamped by an upper loading head of a tensile testing machine, the clamping head is used for clamping one end of a testing piece, and the other end of the testing piece is used for being clamped by a lower loading head of the tensile testing machine. The connecting rod assembly includes four horizontal connecting rods, and four inclined connecting rods. The four horizontal connecting rods are sequentially connected from end to end to form a parallelogram structure, and hinge axes of the four horizontal connecting rods are vertically arranged. Two of the four horizontal connecting rods are longer than the other two, and each of four diagonal corners of the parallelogram structure is hinged with one end of each of the four inclined connecting rods. The other ends of the inclined connecting rods on two of the diagonal corners are hinged with the connector, and a hinge axis of a hinge point of the connector is horizontal, and perpendicular to a connecting line between two corresponding diagonal corners. The other ends of the inclined connecting rods on the other two diagonal corners are hinged with the clamping head, and a hinge axis of a hinge point of the clamping head is horizontal, and perpendicular to a connecting line between two corresponding diagonal corners.

Preferably, a connecting line between the hinge points of the connector and the two inclined connecting rods is shorter than the connecting line between two corresponding diagonal corners. A connecting line between the hinge points of the clamping and the two inclined connecting rods is shorter than a connecting line between two corresponding diagonal corners.

Preferably, each of the horizontal connecting rod and the inclined connecting rod is a rectangular rod.

Preferably, each of the horizontal connecting rod and the inclined connecting rod is a rigid rod.

Preferably, center lines of clamping openings of the upper loading head, the lower loading head and the clamping head are located on the same vertical line.

The present disclosure further provides a tension-torsion loading test system, including a tensile testing machine, and the tension-torsion loading tooling above. An upper loading head of the tensile testing machine is used to clamp a connector, and a lower loading head of the tensile testing machine directly faces a clamping head of the tension-torsion loading tooling.

Compared with the prior art, the present disclosure has the following technical effects:

1. The tension-torsion loading tooling is installed on a tensile testing machine, when an upper loading head of the tensile testing machine moves upwards, a tension load is applied to a test piece in an axial direction by the connecting rod assembly. Meanwhile, by using the deformable characteristics of the parallelogram structure, the parallelogram structure of the connecting rod assembly is about to generate a turning angle in the deformation process, thus transferring a torsional force to the test piece to achieve the purpose of tension-torsion combined loading. The tension-torsion loading tooling is low in production cost, and the cost of the tension-torsion loading tooling can be ignored compared with the tensile testing machine. Moreover, the tensile testing machine is a uniaxial testing machine, and compared with the multiaxial loading testing machine, the purchasing cost of the uniaxial testing machine is much lower than that of the multiaxial loading testing machine.

2. The tension-torsion loading test system provided by the present disclosure is mainly composed of a tensile testing machine and a tension-torsion loading tooling. The tensile testing machine and the tension-torsion loading tooling can be combined to achieve tension-torsion. The cost of the whole system is mainly the tensile testing machine. Moreover, the tensile testing machine is a uniaxial testing machine, and compared with the multiaxial loading testing machine, the purchasing cost of the uniaxial testing machine is much lower than that of the multiaxial loading testing machine.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
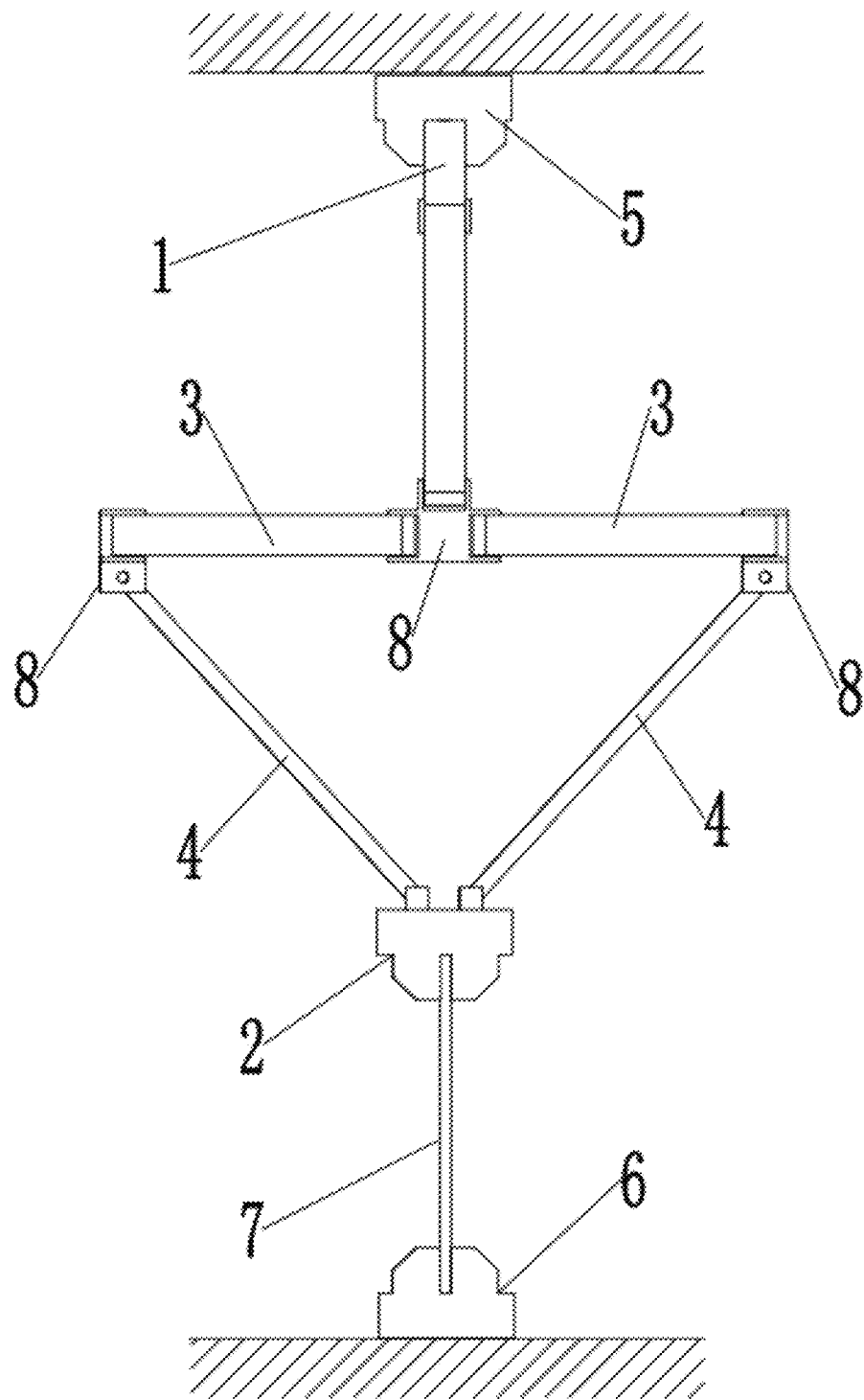
FIG. 1 is a schematic diagram of a front-view structure of a tension-torsion loading test system (before tension-torsion)
Figure 2:
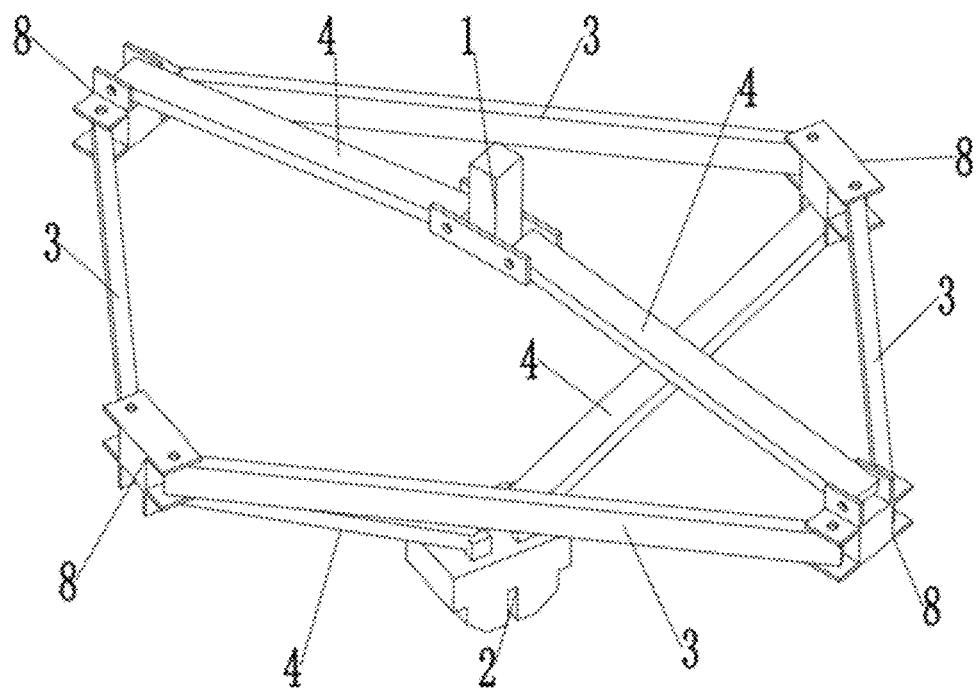
FIG. 2 is a schematic diagram of a three-dimensional structure of a tension-torsion loading tooling (before tension-torsion)

In the drawings: 1—connector; 2—clamping head; 3—horizontal connecting rod; 4—inclined connecting rod; 5—upper loading head; 6—lower loading head; 7—test piece; 8—hinge seat.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the scope of protection of the present disclosure.

Embodiment 1

This embodiment provides a tension-torsion loading tooling, as shown in FIG. 1 to FIG. 11, including a connector 11, a clamping head 2, and a connecting rod assembly. The connecting rod assembly includes four horizontal connecting rods 3, and four inclined connecting rods 4. The four horizontal connecting rods 3 are sequentially hinged from end to end to form a parallelogram structure, and hinge lines of the four horizontal connecting liens 3 are vertically arranged. Two of the four horizontal connecting rods 3 are longer than the other two, and both ends of the two longer horizontal connecting rods 3 are hinged with the two shorter horizontal connecting rods 3, such that the parallelogram structure forms a standard parallelogram with two long sides and two short sides. Each of four diagonal corners of the parallelogram structure is hinged with one end of each of the four inclined connecting rods 4. The other ends of the inclined connecting rods 4 on two diagonal corners are hinged with the connector 1, a hinge axis of a hinge point of each of the two inclined connecting rods 4 and the connector is horizontal, and perpendicular to a connecting line between the two diagonal corners corresponding to the two inclined connecting rods 4 (i.e., a diagonal line). The other ends of the inclined connecting rods 4 on the other diagonal corners are hinged with the clamping head 2, and a hinge axis of a hinge point of each of the two inclined connecting rods 4 and the connector is horizontal, and perpendicular to a connecting line between the two diagonal corners corresponding to the two inclined connecting rods 4 (i.e., a diagonal line). A clamping opening of the clamping head 2 faces downwards, and a back side of the clamping opening of the clamping head 2 is hinged with the inclined connecting rod 4.

Figure 3:
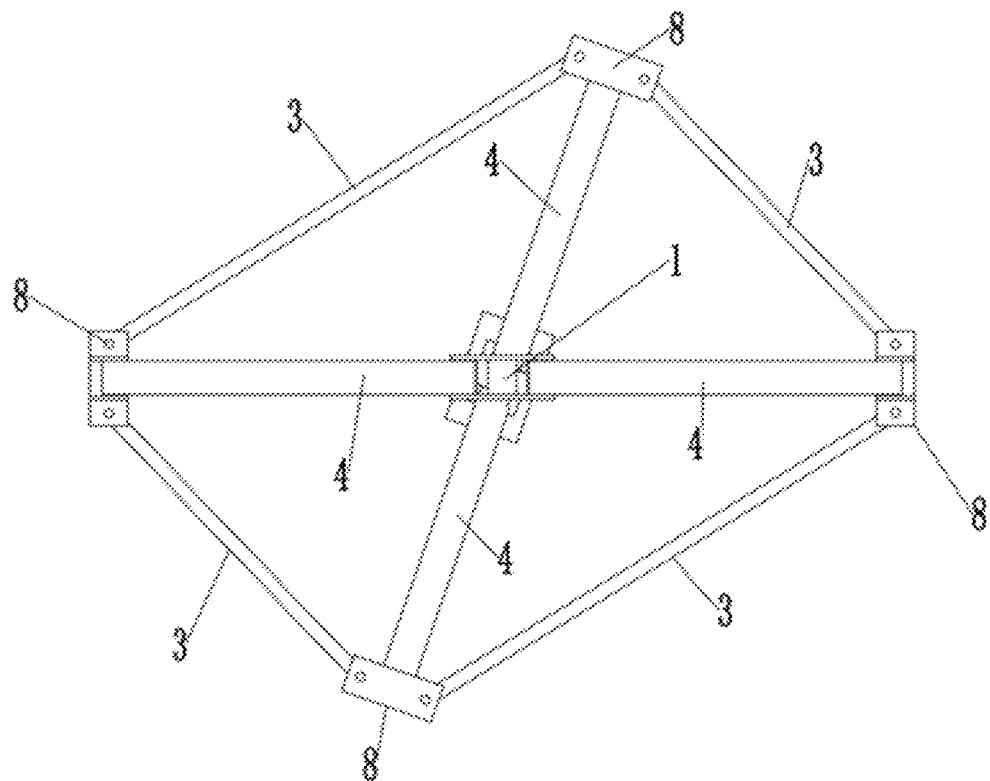
FIG. 3 is a schematic diagram of a top-view structure of a tension-torsion loading tooling (before tension-torsion)
Figure 4:
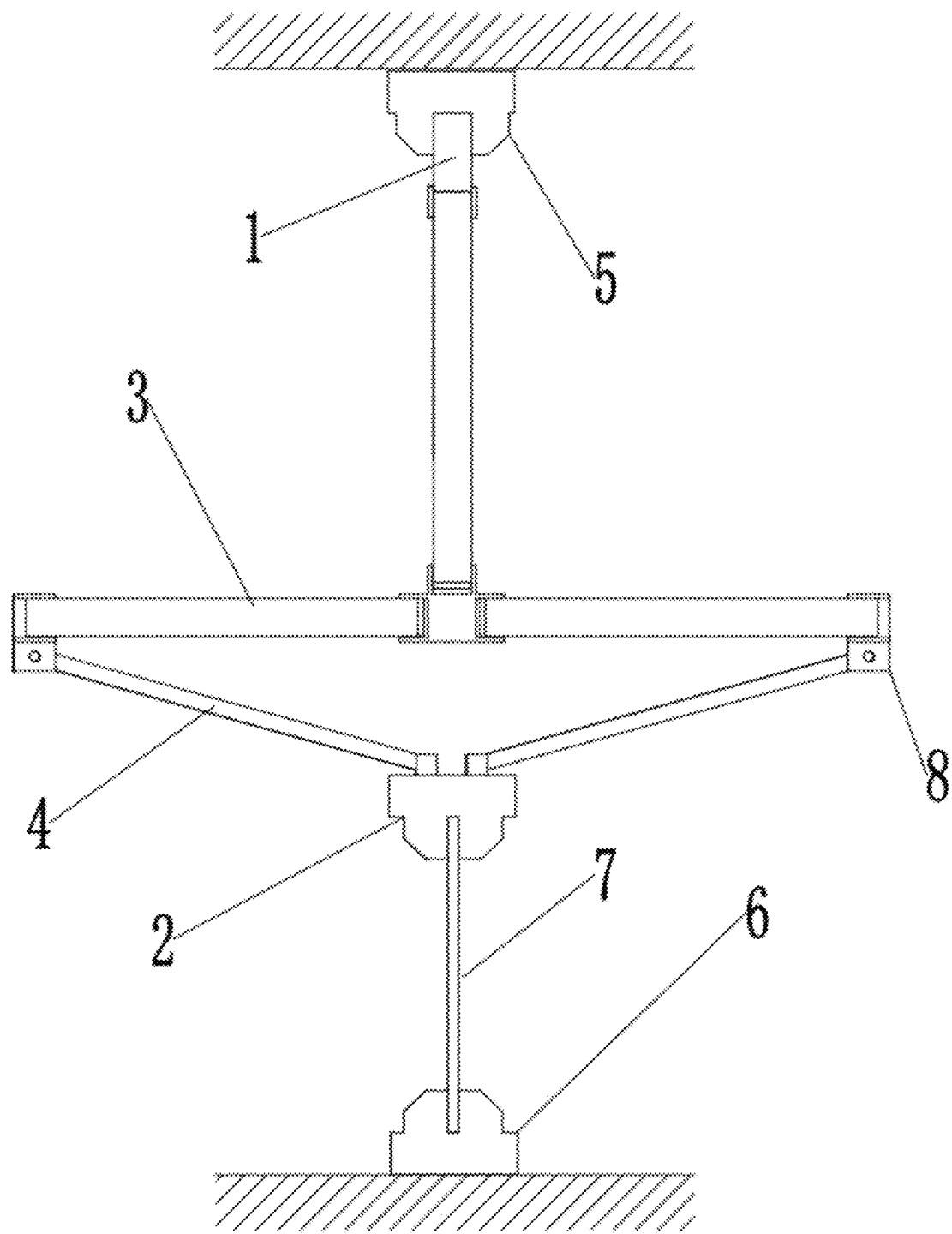
FIG. 4 is a schematic diagram of a front-view structure of a tension-torsion loading test system (during tension-torsion)
Figure 5:
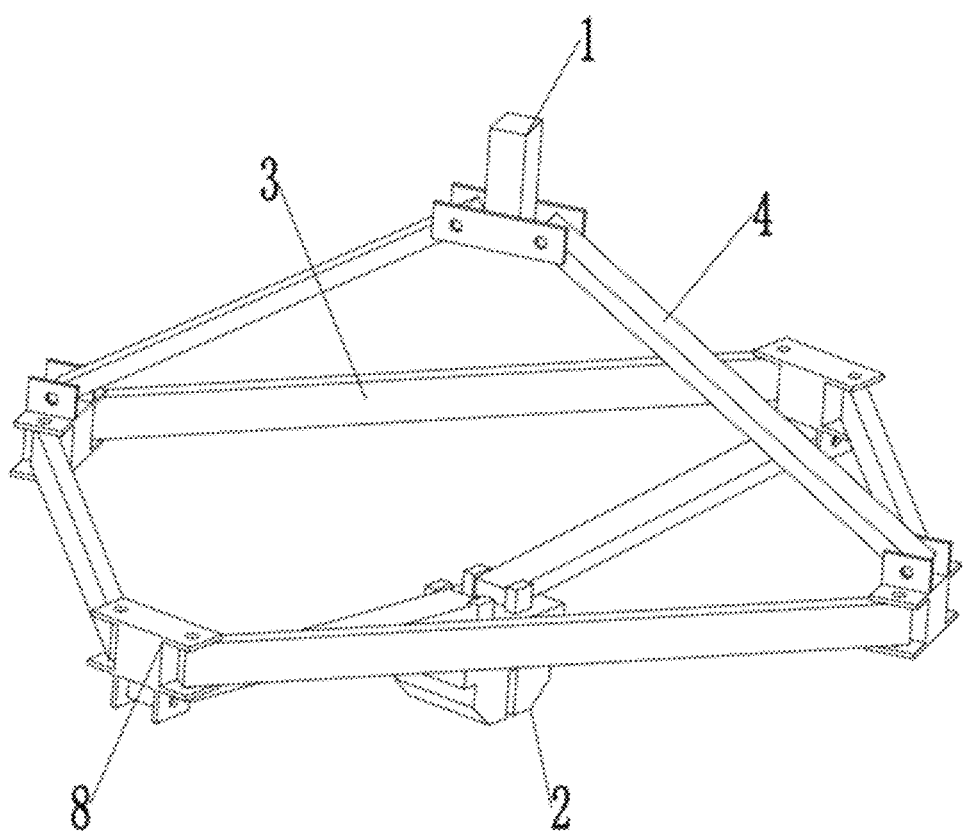
FIG. 5 is a schematic diagram of a three-dimensional structure of a tension-torsion loading tooling (during tension-torsion)
Figure 6:
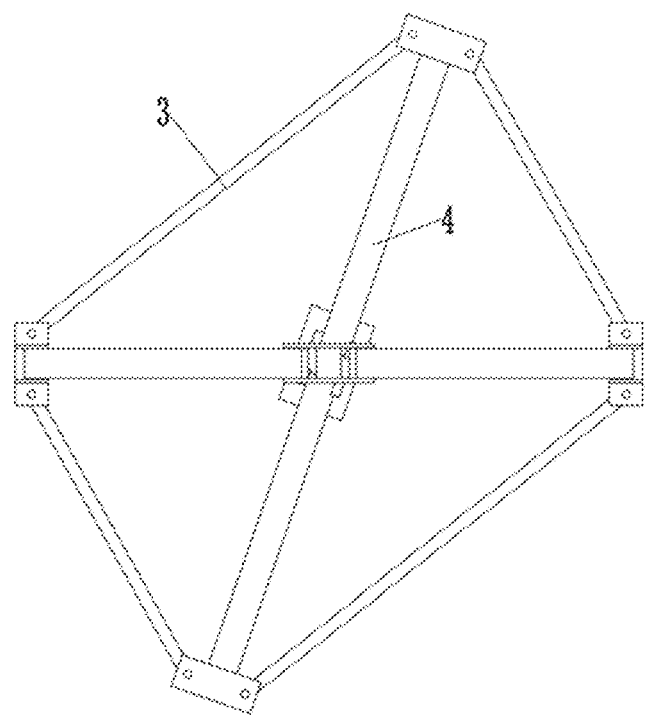
FIG. 6 is a schematic diagram of a top-view structure of a tension-torsion loading tooling (during tension-torsion)
Figure 7:
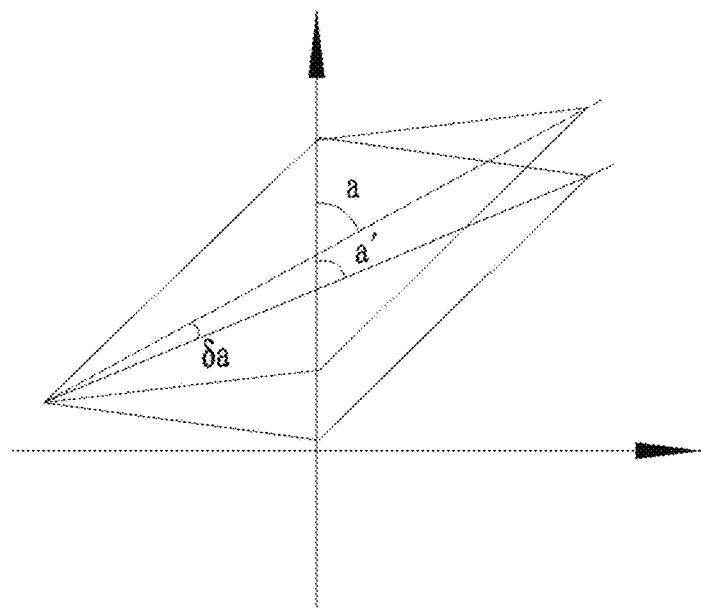
FIG. 7 is a schematic diagram of the deformation of a parallelogram structure in a tension-torsion loading tooling.
Figure 8:
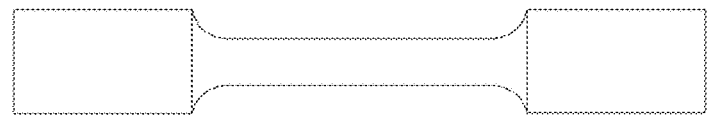
FIG. 8 is a front view of a sheet-like test piece.
Figure 9:
FIG. 9 is a top view of a sheet-like test piece.
Figure 10:
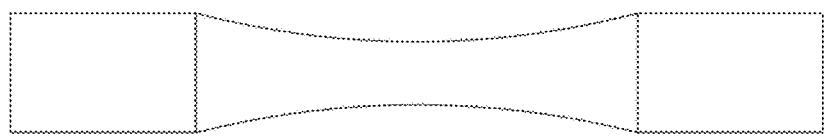
FIG. 10 is a front view of a cylindrical test piece.
Figure 11:
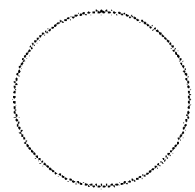
FIG. 11 is a top view of a cylindrical test piece.

The working principle is as follows: the connector 1 is clamped on an upper loading head 5 of a tensile testing machine, one end of a test piece 7 is clamped on a lower loading head 6 of the tensile testing machine, and the other end of the test piece 7 is clamped on the clamping head 2. At this time, the four horizontal connecting rods 3 which form a parallelogram structure are located on the same horizontal plane, and the tensile testing machine used here is a unidirectional tensile device. That is, the upper loading head 5 and the lower loading head 6 of the tensile testing machine can only move up and down relatively, and cannot perform torsion. That is, the tensile testing machine can only play a role of tension than torsion. Compared with multiaxial fatigue testing machine, the purchase cost of such a tensile testing machine is lower. Then, the upper loading head 5 of the tensile testing machine moves upwards to drive the connector 1 to move upwards. The two inclined connecting rods 4 above the parallelogram structure composed of four horizontal connecting rods 3 makes the parallelogram structure composed of the four horizontal connecting rods 3 deformed, and pulls the two inclined connecting rods 4 below the parallelogram structure, thus applying a tensile load to the test piece 7 in the axial direction. At this time, the four horizontal connecting rods 3 are still in the same horizontal plane, and then the parallelogram structure deforms in its plane, and a rotation angle Sa is generated in the deformation process, as shown in FIG. 3, thus transferring a torsional force to the test piece 7 to achieve the combined tensile and torsional loading.

The tension-torsion loading tooling is novel, simple and small in structure, easy to mount and dismount, convenient to use, low in production cost, and capable of being combined with the traditional uniaxial tensile testing machine, thus achieving the purpose of carrying out multiaxial loading test on the material and structure. The test piece 7 may be cylindrical, or sheet-like. The shape of the commonly used test piece 7 is as shown in FIG. 8 to FIG. 11. A material of the test piece 7 is not limited to metal, and the composite material is also applicable.

In this embodiment, as shown in FIG. 1 to FIG. 11, a connecting line between hinge points of the two inclined connecting rods 4 hinged with the connector 1 is shorter than a connecting line between two diagonal corners (i.e., a diagonal line) corresponding to the two inclined connecting rods 4. A connecting line between hinge points of the two inclined connecting rods 4 hinged with the clamping head 2 is shorter than a connecting line between two diagonal corners (i.e., another diagonal line) corresponding to the two inclined connecting rods 4.

In this embodiment, as shown in FIG. 1 to FIG. 11, the two inclined connecting rods 4 above the parallelogram structure have the same length, and the two inclined connecting rods 4 below the parallelogram structure have the same length.

In this embodiment, as shown in FIG. 1 to FIG. 11, each of the horizontal connecting rod 3 and the inclined connecting rod 4 is a rectangular rod. Certainly, the connecting rod may also be a square rod, or the rod with other shapes, and the rectangular rod is the optimal mode.

Further, in this embodiment, as shown in FIG. 1 to FIG. 11, each of the horizontal connecting rod 3 and the inclined connecting rod 4 is a rigid rod, such as a metal rod, or other relatively rigid rods. The metal rod is, for example, a steel rod.

Further, in this embodiment, as shown in FIG. 1 to FIG. 11, center lines of clamping openings of the upper loading head, the lower loading head and the clamping head are located on the same vertical line.

In this embodiment, as shown in FIG. 1 to FIG. 11, hinge modes between the horizontal connecting rods 3, between the inclined connecting rod 4 and the parallelogram structure, between the inclined connecting rod 4 and the connector 1 and between the inclined connecting rod 4 and the clamping head 2 are all shaft hinge.

Further, in this embodiment, as shown in FIG. 1 to FIG. 11, the horizontal connecting rod 3 and the inclined connecting rod 4 are hinged with each other through a hinge seat 8. The hinge seat 8 has three hinge joints, i.e., a first hinge joint, a second hinge joint, and a third hinge joint. The first hinge joint and the second hinge joint are located on the same straight line, and hinge axes of the first hinge joint and the second hinge joint are vertically arranged. Each of the first hinge joint and the second hinge joint is hinged with one end of each of the two horizontal connecting rods 3, and the third hinge joint is perpendicular to a connecting line between the first hinge joint and the second hinge joint. A hinge axis of the third hinge joint is horizontally arranged, and the third hinge joint is hinged with one end of the inclined connecting rod 4.

Embodiment 2

This embodiment provides a tension-torsion loading test system, as shown in FIG. 1 to FIG. 11, including a tensile testing machine, and a tension-torsion loading tooling of Embodiment 1. An upper loading head 5 of the tensile testing machine is used to clamp the connector 1, and a lower loading head 6 of the tensile testing machine directly faces the clamping head 2 of the tension-torsion loading tooling. The tensile testing machine is a unidirectional tensile device. That is, the upper loading head 5 and the lower loading head 6 of the tensile testing machine can only move up and down relatively, and cannot perform torsion. That is, the tensile testing machine can only play a role of tension than torsion. Compared with multiaxial fatigue testing machine, the purchase cost of such a tensile testing machine is lower.

The working principle is as follows: one end of a test piece 7 is clamped on the lower loading head 6 of the tensile testing machine, and the other end of the test piece 7 is clamped on the clamping head 2. At this time, the four horizontal connecting rods 3 forming a parallelogram structure are located on the same horizontal plane, then, the upper loading head 5 of the tensile testing machine moves upwards to drive the connector 1 to move upwards. The two inclined connecting rods 4 above the parallelogram structure composed of four horizontal connecting rods 3 makes the parallelogram structure composed of the four horizontal connecting rods 3 deformed, and pulls the two inclined connecting rods 4 below the parallelogram structure, thus applying a tensile load to the test piece 7 in the axial direction. At this time, the four horizontal connecting rods 3 are still in the same horizontal plane, and then the parallelogram structure deforms in its plane, and a rotation angle da is generated in the deformation process, as shown in FIG. 3, thus transferring a torsional force to the test piece 7 to achieve the combined tensile and torsional loading.

The tension-torsion loading test system provided by the present disclosure is mainly composed of the tension-torsion loading tooling and the traditional tensile testing machine, the main cost is from the tensile testing machine, and the manufacturing cost of the tension-torsion loading tooling is almost negligible compared with the tensile testing machine. Moreover, the tensile testing machine is a uniaxial testing machine, and compared with the multiaxial loading testing machine, the purchasing cost of the uniaxial testing machine is much lower than that of the multiaxial loading testing machine. The test piece 7 may be cylindrical, or sheet-like, and the shape of the commonly used test piece 7 is as shown in FIG. 8 to FIG. 11. A material of the test piece 7 is not limited to metal, and the composite material is also applicable.

Specific examples are used herein for illustration of the principles and embodiments of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A tension-torsion loading tooling, comprising a connector, a clamping head, and a connecting rod assembly, wherein the connector is used for being clamped by an upper loading head of a tensile testing machine, the clamping head is used for clamping one end of a testing piece, and the other end of the testing piece is used for being clamped by a lower loading head of the tensile testing machine; the connecting rod assembly comprises four horizontal connecting rods, and four inclined connecting rods; the four horizontal connecting rods are sequentially connected from end to end to form a parallelogram structure, and hinge axes of the four horizontal connecting rods are vertically arranged; two of the four horizontal connecting rods are longer than the other two, and each of four diagonal corners of the parallelogram structure is hinged with one end of each of the four inclined connecting rods; the other ends of the inclined connecting rods on two of the diagonal corners are hinged with the connector, and a hinge axis of a hinge point of the connector is horizontal, and perpendicular to a connecting line between two corresponding diagonal corners; the other ends of the inclined connecting rods on the other two diagonal corners are hinged with the clamping head, and a hinge axis of a hinge point of the clamping head is horizontal, and perpendicular to a connecting line between two corresponding diagonal corners.

2. The tension-torsion loading tooling according to claim 1, wherein a connecting line between the hinge points of the connector and the two inclined connecting rods is shorter than the connecting line between two corresponding diagonal corners, and a connecting line between the hinge points of the clamping and the two inclined connecting rods is shorter than a connecting line between two corresponding diagonal corners.

3. The tension-torsion loading tooling according to claim 2, wherein each of the horizontal connecting rod and the inclined connecting rod is a rigid rod.

4. The tension-torsion loading test system according to claim 3, wherein each of the horizontal connecting rod and the inclined connecting rod is a rigid rod.

5. The tension-torsion loading tooling according to claim 1, wherein each of the horizontal connecting rod and the inclined connecting rod is a rectangular rod.

6. The tension-torsion loading tooling according to claim 5, wherein each of the horizontal connecting rod and the inclined connecting rod is a rigid rod.

7. The tension-torsion loading test system according to claim 6, wherein each of the horizontal connecting rod and the inclined connecting rod is a rigid rod.

8. The tension-torsion loading tooling according to claim 1, wherein each of the horizontal connecting rod and the inclined connecting rod is a rigid rod.

9. The tension-torsion loading tooling according to claim 1, wherein center lines of clamping openings of the upper loading head, the lower loading head and the clamping head are located on the same vertical line.

10. A tension-torsion loading test system, comprising a tensile testing machine, and the tension-torsion loading tooling according to claim 1, wherein an upper loading head of the tensile testing machine is used to clamp a connector, and a lower loading head of the tensile testing machine directly faces a clamping head of the tension-torsion loading tooling.

11. The tension-torsion loading test system according to claim 10, wherein a connecting line between the hinge points of the connector and the two inclined connecting rods is shorter than the connecting line between two corresponding diagonal corners, and a connecting line between the hinge points of the clamping and the two inclined connecting rods is shorter than a connecting line between two corresponding diagonal corners.

12. The tension-torsion loading test system according to claim 10, wherein each of the horizontal connecting rod and the inclined connecting rod is a rectangular rod.

13. The tension-torsion loading test system according to claim 10, wherein each of the horizontal connecting rod and the inclined connecting rod is a rigid rod.

14. The tension-torsion loading test system according to claim 10, wherein center lines of clamping openings of the upper loading head, the lower loading head and the clamping head are located on the same vertical line.

* * * * *